Dec. 16, 1930.    E. G. STAUDE    1,785,052
AUTOMATIC BRAKE CONTROL FOR POWER PROPELLED VEHICLES
Filed Dec. 11, 1925    8 Sheets-Sheet 5

INVENTOR
EDWIN G STAUDE
BY
ATTORNEYS

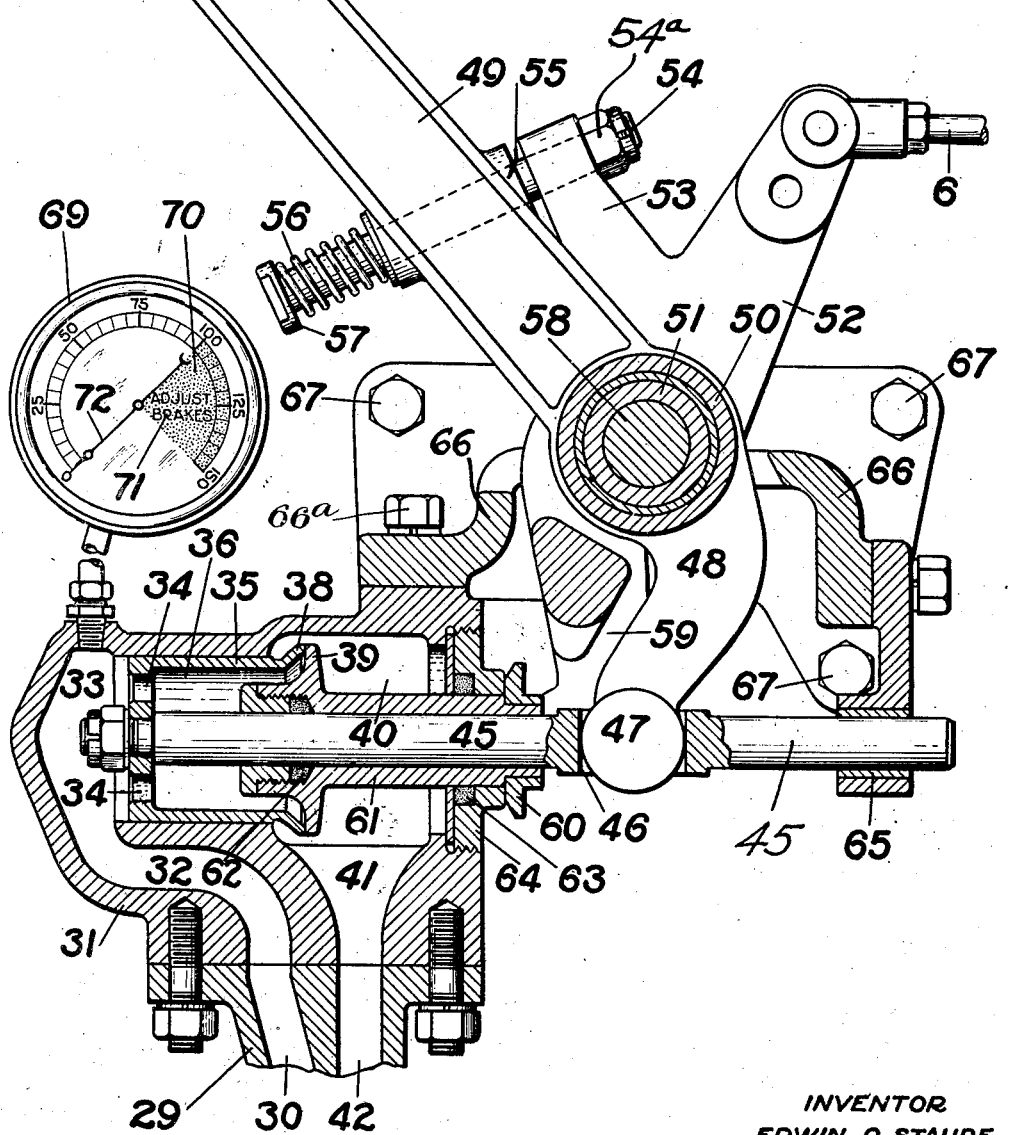

Dec. 16, 1930.  E. G. STAUDE  1,785,052
AUTOMATIC BRAKE CONTROL FOR POWER PROPELLED VEHICLES
Filed Dec. 11, 1925    8 Sheets-Sheet 7
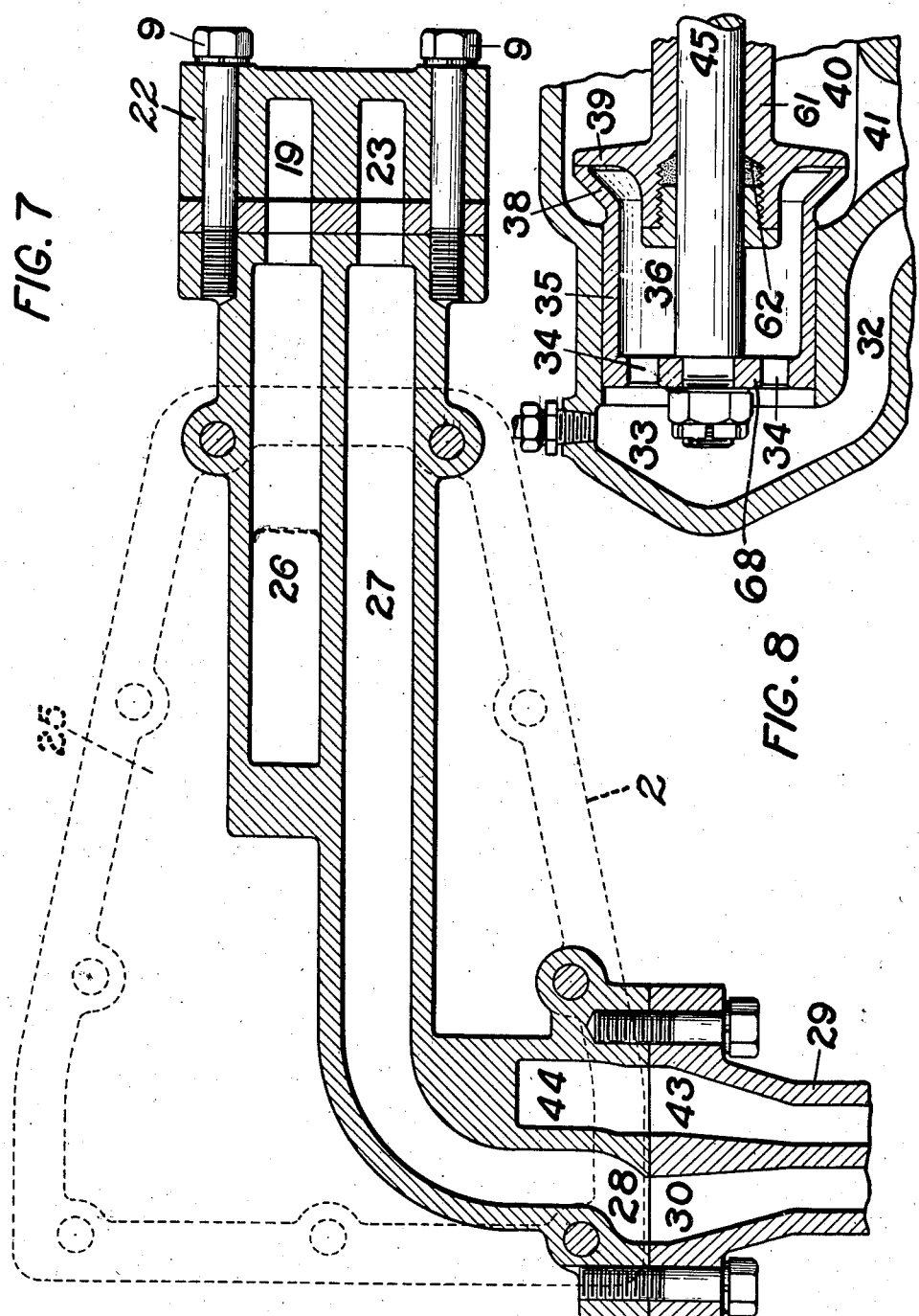
INVENTOR
EDWIN G STAUDE
BY
ATTORNEYS Dec. 16, 1930.  E. G. STAUDE  1,785,052
AUTOMATIC BRAKE CONTROL FOR POWER PROPELLED VEHICLES
Filed Dec. 11, 1925  8 Sheets-Sheet 8

INVENTOR
EDWIN G. STAUDE
BY *Paul Paul Moore*
ATTORNEYS

Patented Dec. 16, 1930

1,785,052

UNITED STATES PATENT OFFICE

EDWIN G. STAUDE, OF MINNEAPOLIS, MINNESOTA

AUTOMATIC BRAKE CONTROL FOR POWER-PROPELLED VEHICLES

Application filed December 11, 1925. Serial No. 74,767.

This invention relates to improvements in fluid actuated mechanisms for assisting in the setting and releasing of friction brakes on the wheels or transmission shaft of power propelled vehicles to retard the movement of the vehicle, and is an improvement over the form shown in my pending patent application filed May 18, 1925, Serial #31,084.
One of the objects of the present invention is to provide an improved fluid pressure controlling valve mechanism having a connection with the usual brake rod and brake pedal of the vehicle, so constructed that when the pedal is actuated, a definite, progressive pull will be exerted on the brake rod proportional to the degree of movement of the brake pedal and an increased brake pedal pressure built up progressively as the load on the brake rod increases. This has been found very important so that the driver may retain the "feel" of the brake foot pedal perfectly to properly control the vehicle, even though with the use of my device the required pedal pressure throughout the entire movement or stroke of the pedal is materially reduced as compared with the brake mechanisms of ordinary construction.

A further object of my invention is to provide a mechanism which will always carry a certain, definite, proportionate part of the pedal load, regardless of the speed of the vehicle.

A further object of my invention is to provide a means which will indicate when the brakes need readjustment.

A further object of my invention is to provide a fluid-controlled brake-actuating mechanism indirectly operable by a foot pedal, or other lever, so constructed to require a certain predetermined foot pressure upon the pedal to cause the mechanism to be operated to set the brakes, thereby providing a brake-actuating mechanism which will be similar in operation to an ordinary mechanically operated brake, but will require relatively less pressure upon the brake pedal to actuate the brakes.

A further object is to provide a compact mechanism enclosed and therefore free from dirt or other foreign substance which might interfere seriously with the proper functioning of the valve connections if they were exposed to the elements.

A further object is to provide a mechanism of the above character of simple and inexpensive construction which may be manufactured at a minimum cost, and adapted to be operatively connected to the engine or crank case of a motor-propelled vehicle to utilize the lubricating fluid to actuate the brakes.

In the accompanying drawings, forming a part of this specification,

Figure 6 is a view similar to Figure 5, except that the pedal is in a partly depressed position, showing the controlling valve in the position where the circulation of the fluid through the valve mechanism is cut off, and also showing the brake adjusting indicator;

Figure 7 is a sectional view on the line 7—7 of Figure 1, showing the location of the fluid passage from the pump to the pressure cylinder;

Figure 8 is an enlarged detail sectional view of the valve mechanism;

Figure 1:
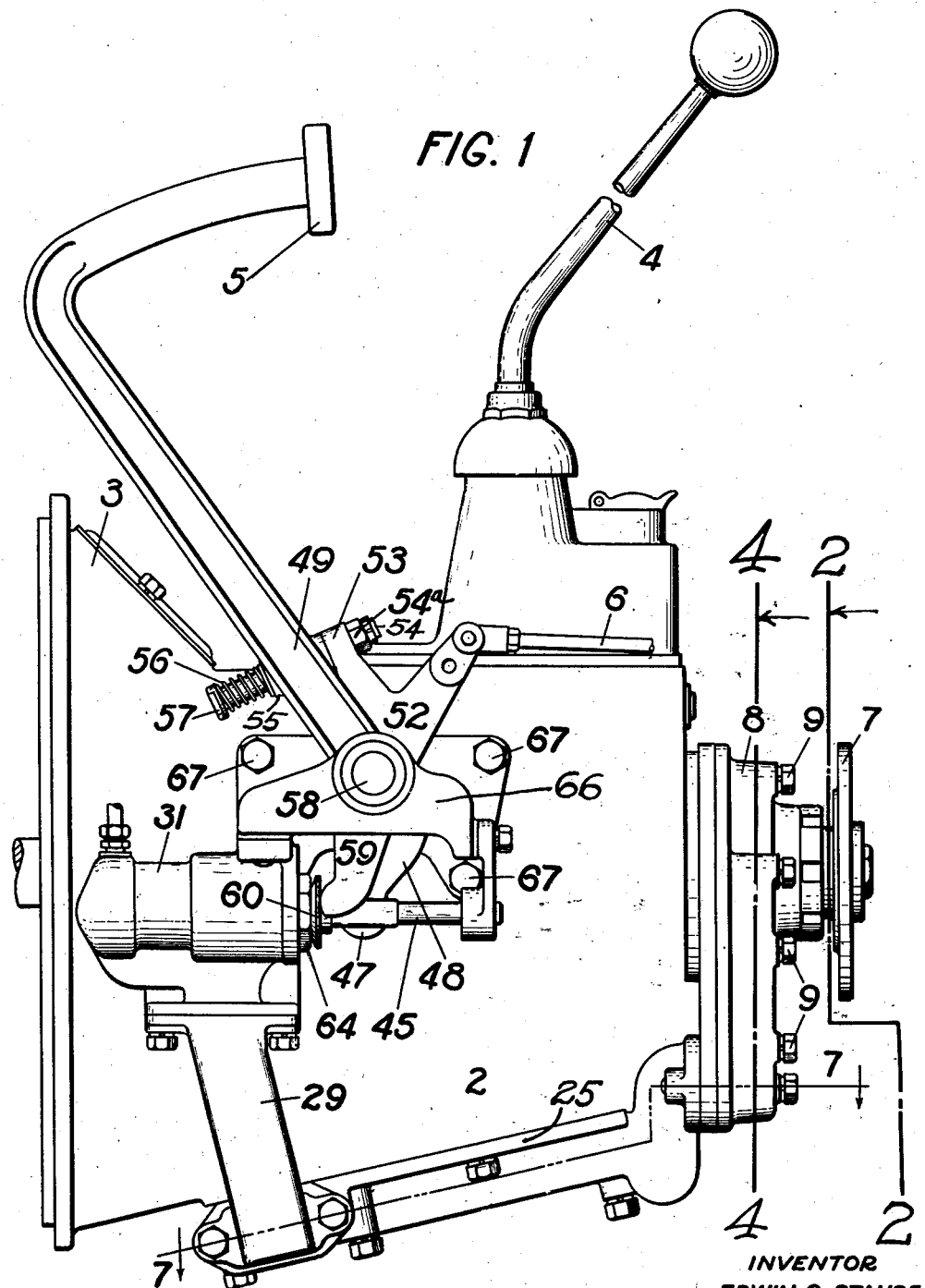
Figure 1 is a side elevation of an automobile transmission case with my invention applied thereto;
Figure 2:
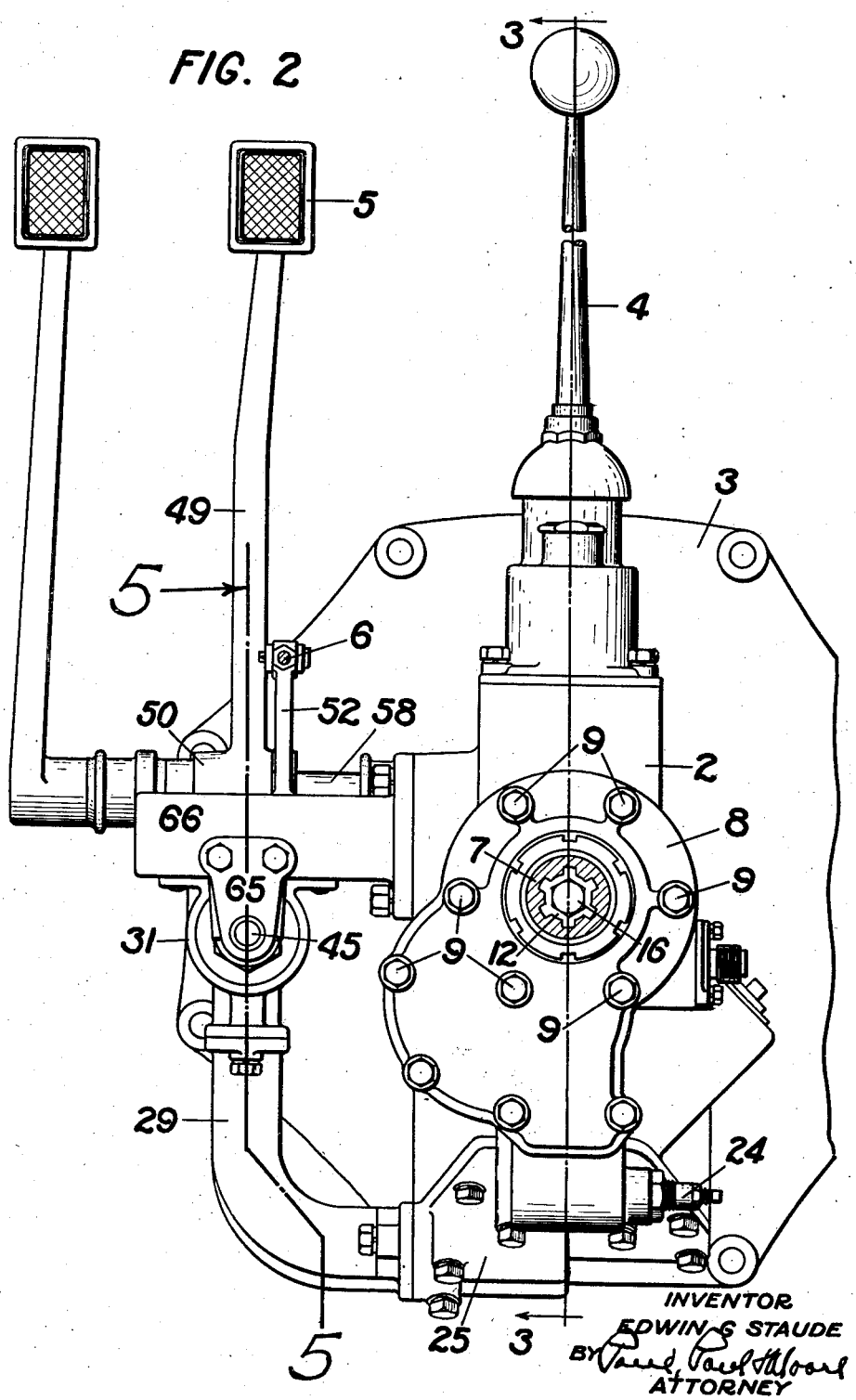
Figure 2 is a sectional view on the line 2—2 of Figure 1.

In the drawing, 2 represents an ordinary motor car transmission case, having the usual fly-wheel housing 3 and the gear-shift lever 4; also the brake pedal 5 and brake rod 6. 7 is the usual propeller or drive shaft coupling mounted in the conventional manner.

Figure 4:
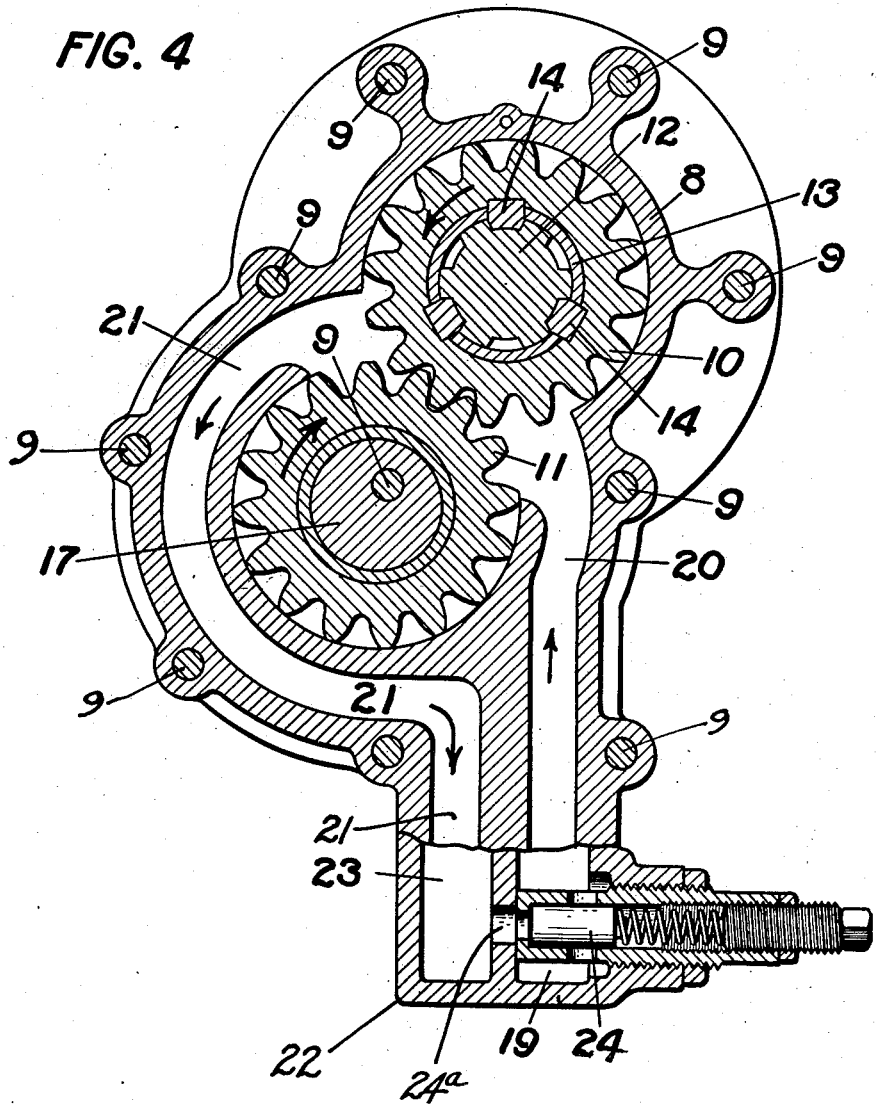
Figure 4 is a detail sectional view on the line 4—4 of Figure 1 showing the oil passages, and the pressure relief valve.

Between the end of the transmission case and the propeller shaft coupling 7, I mount a suitable pump housing 8, secured to the transmission case by bolts 9. Within the pump housing I provide a pair of gears 10 and 11, the gear 10 being mounted on a sleeve 13 secured to the usual splined transmission shaft 12, (see Figure 4). The gear 10 is free to slide on the sleeve 13 and is prevented from rotating thereon by means of keys 14. The sleeve 13 is therefore self-aligning. This sleeve also acts as a spacer and has one end bearing against the inner race of the usual ball bearing 15 and its other end against the coupling 7 which is securely clamped by means of the usual washer and cap screw 16. The lower gear 11 is mounted to revolve on a boss 17 projecting inwardly from the wall 18 of the pump housing 8. Referring to Figure 4, it will be noted that the pump gear 10, mounted on the sleeve 13 on the shaft, will revolve in the direction indicated by the arrow, when the vehicle is traveling forward, and its co-acting member 11 will, therefore, revolve in the opposite direction as shown. It follows, therefore, the fluid will be drawn into the pump gears through an intake port 19 and a passage 20 and after passing the pump will be delivered into a channel 21 terminating in a chamber 23 in the lower portion 22 of the pump housing 8. A relief valve 24 may be provided in the intake port 19 to relieve the pressure in the chamber 23 when a predetermined pressure is reached during the operation of the apparatus. This valve communicates with the chamber 23 through a port 24ª.

Figure 3:
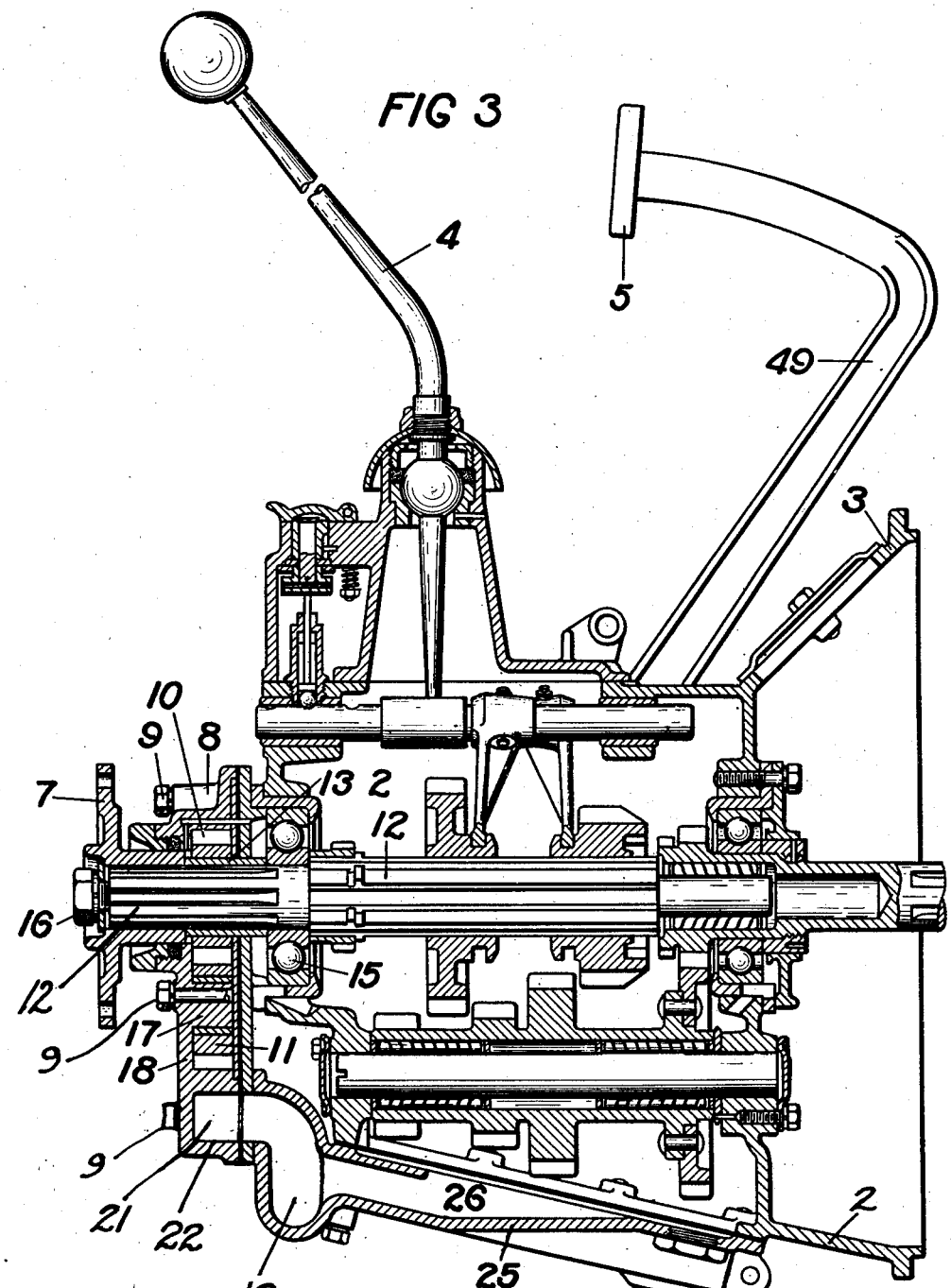
Figure 3 is a vertical sectional view on the line 3—3 of Figure 2, looking in the direction of the arrow;

Secured to the underside of the transmission case is a plate 25 providing a closure in the usual manner. Suitable ports 26 and 27 are preferably cast in this cover plate, the former communicating with the intake port 19, and the latter with the chamber 23 and therefore provides the exhaust or discharge for the gear pump. The intake port 26 communicates with the bottom of the transmission case as shown in Figure 3. The port 27 connects the chamber 23 with a passage 30 provided in a manifold 29 as shown in Figure 7. The passage 30 connects with a port 32 leading to a chamber 33 in a valve casing 31 suitably secured to the pedal bracket 66 by bolts 66ª as shown in Figure 5.

A hollow cylindrical valve seat 35 is mounted to slide in the casing 31, and a spider construction provides the circulation openings at the intake end of the valve seat. These openings are designated 34 and lead from the chamber space 33 through the valve seat, this passage being designated 36, thus establishing constant communication.

The opposite end of the seat 35, that is at the exhaust end, opposite the openings 34, is provided with a flaring flange 38. This flange has greater inside area than the opposite or intake end of the seat. The area of the seat end is thus greater than the area of the opposite or receiving end, to create a back pressure on the valve seat, and thus on the pedal. A rod 45 is connected to the valve seat 35 and has an opening 46 therein to receive the end portion 47 of the depending arm 48 that is secured to the pedal arm 49. The rod 45 has a bearing 65 secured to a pedal bracket 66 which preferably supports the entire pedal mechanism and is secured to the transmission case by suitable means such as bolts 67. A sleeve 61 is mounted to slide on the rod 45 and has a flanged portion forming the valve 39 between which and the valve seat 35 the fluid flows when the transmission circuit is open. Normally, the valve 39 will be spaced from the flange 38 of the valve seat 35, as indicated in Figure 5, forming a passage 37 to allow the free flow of the fluid through the valve from the chamber 36 to the chamber 40 and the port 41 leading to the passage 42 which communicates with the ports 43 and 44 and the transmission case. The valve seat 35, as shown in Figures 5 and 6, is substantially cup-shaped, cylindrical in form, and is mounted to have a limited reciprocating movement. Normally it stands in the position shown in Figure 5 with a gap between its flaring end and the valve 39 which also has a limited reciprocating movement and cooperates with the valve seat 35 to temporarily obstruct the flow of fluid through the passages or allow freedom of such flow depending upon the position of the foot pedal and its connections with the brakes.

Figure 5:
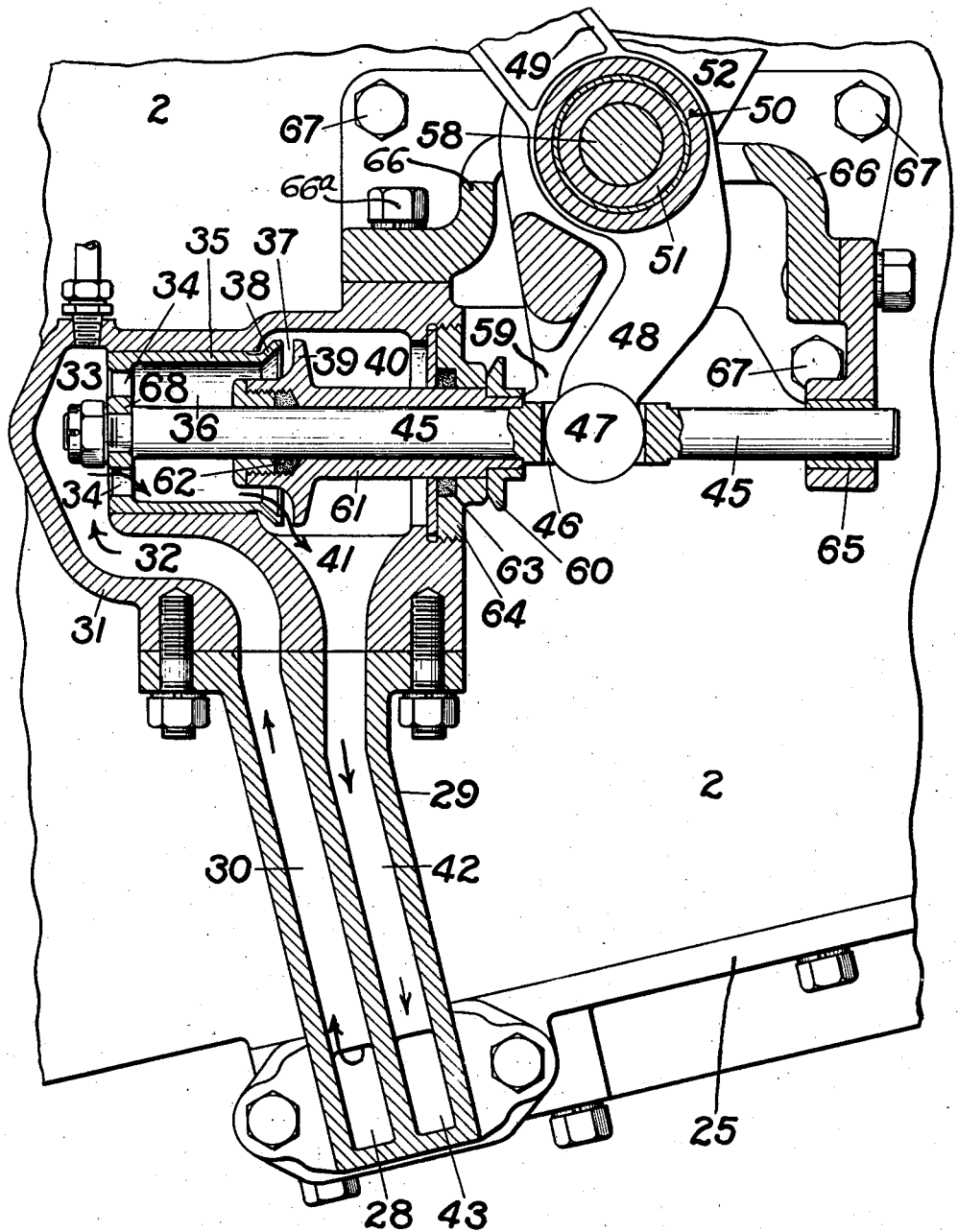
Figure 5 is a detail sectional view on the line 5—5 of Figure 2 showing the controlling valve and its relative position with respect to other parts of the mechanism when the fluid circuit is open.
Figure 9:
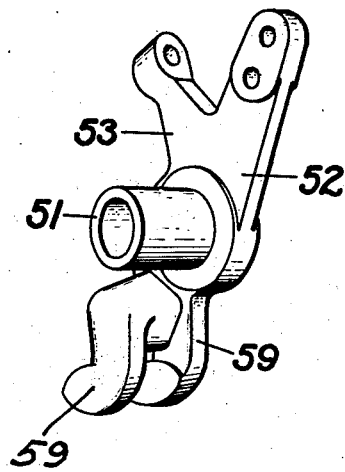
Figure 9 is a perspective view of the brake rod actuating member removed from the apparatus.
Figure 10:
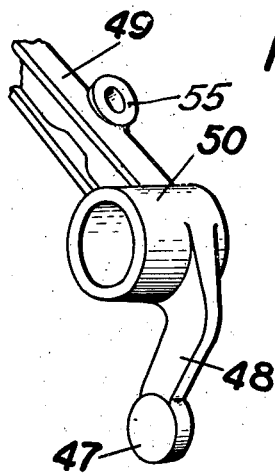
Figure 10 is a similar view showing the lower portion of the brake pedal; and Figure 11:
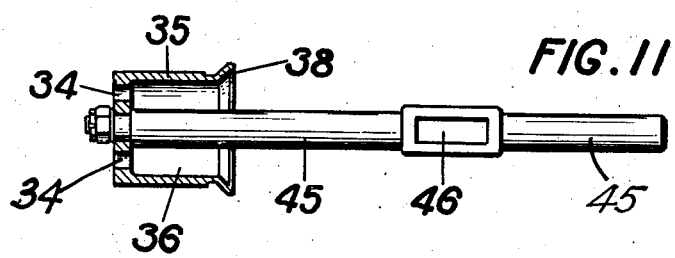
Figure 11 is a detail view showing the valve and valve-actuating rod removed from the apparatus.

In Figure 5, the valve and its seat are separated, and the fluid actuated by the pump may flow freely through them.

A hub 50 is provided on the pedal arm 49 which is rotatably mounted upon a relatively smaller hub 51 of a brake rod arm 52 having the brake rod 6 connected thereto as shown in Figure 1. The brake rod arm 52 has an extension 53 adapted to receive one end of a bolt 54 slidably mounted in a hub 55 provided on the pedal arm 49. A compression spring 56 is coiled about one end of the bolt 54 and is interposed between the head 57 thereof and the hub 55 of the lever arm 49. This spring functions to normally and yieldably hold the extension 53 of the brake arm 52 against the end of the hub 55 as shown in Figure 1. The hub 51 of the brake arm 52 is rotatably mounted upon the clutch shaft 58. A fork 59 is preferably integrally formed with the brake arm 52 and depends therefrom and engages a washer or flanged member 60 terminally mounted upon a sleeve 61 which is slidably mounted in a plug 64 secured to one end of the valve casing 31 as shown in Figure 6. The sleeve 61 is concentrically bored to receive the rod 45 to provide a support therefor. A suitable packing 62 is provided in the inner end of the sleeve 61 to prevent oil leakage through the bore of the sleeve 61. A similar packing 63 is also provided in the plug 64 adapted to engage the sleeve 61 to prevent oil leakage between the sleeve and the bore of the plug 64. The forward end of the rod 45 is preferably supported in a bearing 65 secured to the pedal bracket 66 which supports the entire pedal mechanism including the shaft 58 and the cylinder 31. The bracket 66 is secured to the transmission case 2 by means of bolts 67 (see Figure 6).

In the operation of this novel brake control mechanism, the pump gears 10 and 11 rotate continuously with the transmission shaft of the engine, thereby causing the oil to be drawn from the transmission case into the passage 26 intake port 19, passage 20 through the pump and into the channel 21, chamber 23, passages 27 and 30, port 32 and into the chamber 33 at the end of the valve casing shown in Figure 5. From the chamber 33, it will enter the chamber 36 of the valve seat 35 from whence it will flow through the annular gap 37 provided at the opposite end, between it and the valve 39 and into the chamber 40. From the chamber 40, it will flow downwardly through the return passage 42 and through the opening 44 back to its source or the interior of the transmission case, thus completing the normal circulation when the brakes are not in action. As soon, however, as it is desired to actuate the brakes and the brake arm 49 is depressed to the position shown in Figure 6, the rod 45 will be longitudinally moved as a result of its connection with the depending arm 48 of the brake arm. Such movement of the rod 45 will cause the valve seat 35 to be moved towards the valve 39 thereby tending to interrupt the flow of the fluid through the gap 37. As soon as the brake pedal is depressed with a nominal pressure, the valve seat 35 will seat against the valve 39, thus closing the oil circulation through the valve and incidentally building up a pressure within the chamber 33, which, operating against the relatively greater area of the valve 39, will move the sleeve 61 and the washer 60 terminally mounted thereon. Such movement of the washer 60 will cause the forked arm 59, in engagement therewith, to rock upon the shaft 58 thereby oscillating brake rod arm 52 with the resultant setting of the brakes through the actuation of the brake rod 6.

When the brakes are inactive, the valve seat 35 and valve 39 will be held in the open or separated position shown in Figure 5, by the action of the spring 56. When the parts are thus positioned the fluid will flow uninterruptedly through the valve mechanism, as indicated by the arrows in Figure 5. It will be noted, by reference to Figure 6, that before the valve seat 35 can be moved into closing position against the valve 39, the compression spring 56 must first be compressed. The initial pressure thus required on the foot pedal 5 to compress the spring 56, before the valve seat 35 is actuated may be regulated to any predetermined degree by the adjustment of the nut 54ª. This spring and bolt, therefore, provide a yieldable connection between the brake arm 52 and the pedal arm 49 and normally hold the valve mechanism in open position as shown in Figure 5. It is, therefore, necessary in the operation of the valve mechanism to set the brake, that the pedal arm be relatively moved with respect to the brake arm 52 in order that the valve mechanism may be moved into closing position to interrupt the flow of oil therethrough as shown in Figure 6.

In actual practice, I provide a tension on the spring 56 that will require a pedal pressure of approximately 10 to 15 pounds before the spring will be compressed and seat the valve seat 35. Unless the movement of the pedal arm 49 is followed up with the valve seat 35 by a further brake pedal depression, the fluid pressure built up by the interruption of the fluid will cause the valve 39 to move away from the end of the valve seat 35 to the open position shown in Figure 5 whereupon the pressure will again drop, but not until it has made a certain definite progressive movement of the brake rod, proportionate to the distance that the brake pedal has been depressed. If the brake pedal is depressed still further, the pressure will continue to move the valve 39 and therefore the sleeve 61 actuating against the fork 59 of the brake arm 52.

As the load on the brake rod increases, it will likewise increase the pressure against the valve 39, and as the pressure continues to build up at the heat end of the valve seat element 35 the valve 39 will be forced away from the valve seat 35 thereby allowing a portion of the fluid to enter the chamber 40 to be returned to the transmission case. To increase the pull on the brake rod 6, additional pressure must be brought to bear against the foot pedal 5 to again close the valve mechanism and interrupt the flow of fluid therethrough, thus causing a definite progressive pedal pressure, and a corresponding pedal movement to obtain a definite progressive brake action without quick or sharp grabbing characteristics.

Referring to Figure 8, it will be noted that the pressure on the valve seat 35 is the total area of the valve head 68, and the area exposed to back pressure is the inside area of the flange 38. This being greater than the head area 68, as the pressure builds up, it will distribute a proportionate part of the back pressure tending to move and open the valve seat 35 against the pressure on head 68 and transmit this force through the valve head 68 and its connections to the pedal 5 through the pedal arm 49.

During the initial pedal depression, the fluid circulation is obstructed by reducing the space between the valve and seat. This will cause the pressure to increase within the movable valve seat element which pressure bearing against the valve will cause the element to move, and during its initial movement to slightly set the brakes. The movement of the valve can only be slight, because, during the movement, the valve will move away from the seat, thereby increasing the space between the valve and seat, and, of course, causing a drop in the pressure. The movement of the valve is, however, sufficient to carry the load required to set the brakes, minus that part of the load carried by the spring, which keeps the valve seat away from the valve when the circuit is fully open. Further depression of the pedal will repeat the cycle of operations of the valve and valve seat, except that as more pressure is required to set the brakes more firmly, a higher pressure will be necessary to move the valve and consequently a greater reduction in the space between the valve and seat, so that by the time the brakes are fully set to lock the wheels, the space between the valve and seat is only several thousandths of an inch.

The circulation must at all times be maintained so long as the vehicle is moving, otherwise some of the parts would be liable to fracture due to excessive pressure. In order to avoid the possibility of excessive pressure, a by-pass valve is provided. After the pressure has reached the point where the by-pass valve begins to function, then the valve seat and valve may be entirely closed, since the circulation is maintained through the by-pass valves. Since it is very desirable to not only have the degree of pedal depression to regulate the degree of brake application, but also to provide increased pedal pressure to obtain increased braking effort, this is provided for by flaring out the valve seat, so that an increased area is provided on the seat end over the area at the opposite end, so that as the pressure in the valve seat is built up, it will cause a correspondingly increased back pressure on the brake pedal.

Since the increase in fluid pressure against the valve 39 will depend on the increased pedal pressure, it results in a uniform increase in pedal pressure and pedal stroke which is necessary to retain the "feel" of the brakes to secure the maximum brake effect. As the pressure continues to build up, the valve mechanism continues to partially open, thereby causing a slight circulation of oil through the pump, through the valve and between the valve seat 35 and valve 39 and into the chamber 40 from whence it will be returned to the interior of the transmission case by means of the passage 42. Such continued opening of the valve mechanism will, therefore, require additional pedal pressure which will be directly proportional to the brake pull on the rod 6 for a given volume of fluid, which will result in a further definite progressive pedal pressure for a definite progressive brake action.

If there is no oil pressure the flange 38 of the valve seat 35 will seat against the valve 39 and actuate the brake in the usual manner without application of additional pedal pressure.

The required pedal pressure for a definite brake action can be varied to suit any requirement. By increasing the tension of the spring 56, a greater pressure will be required on the brake pedal to actuate the valve mechanism and conversely by reducing the tension of the spring 56, a decreased pedal pressure will be required for a given amount of brake action, so that a pedal pressure which is normally from 40 to 175 pounds on brakes of ordinary construction may be reduced to from 10 to 50 pounds or even less according to the pressure desired by the operator to actuate the brakes. While the pressure required to actuate the brakes may thus be substantially decreased by the use of this novel mechanism, the pressure required to actuate the pedal arm 49 will be sufficient to prevent the operator from jamming or locking the brakes. The operation of actuating the brake pedal therefore will be substantially the same as that of an ordinary brake pedal with the exception that the pressure required to actuate it will be greatly lessened.

I have shown a relief valve 24 in Figure 4 which in practice I set to limit the maximum oil pressure to the maximum figure shown on the pressure gauge 69 preferably mounted in a convenient place on the instrument board of the vehicle. This gauge is connected to the pressure side of the oil circuit, preferably to the valve casing 31, to be in direct communication with the chamber 33 at one end thereof.

Since the area of the annular valve 39 and its connections is such that a maximum pressure of from 75 to 100 pounds per square inch is all that is required to set the brakes to lock the wheels of the vehicle, it follows that whenever an oil pressure of 100 pounds per square inch or over is indicated on the pressure gauge 69 the operation of the apparatus is abnormal and the brakes are, therefore, out of adjustment. I, therefore, provide a special face on the oil pressure gauge in which the shaded portion 70 will serve as a warning to the operator or driver that the brakes are out of adjustment when the pointer 72 registers over 100 pounds or enters such shaded portion. The words such as "Adjust brakes" may be imprinted on the shaded portion 70 to call the operator's attention to this requirement. The employment of this gauge with the valve mechanism I regard as an important feature of the invention for it serves as a definite warning or notice to the driver of the true condition of the brakes, calling attention to the need of adjustment, it being well known that many automobile accidents are the direct result of the brakes being out of proper adjustment.

In various ways, the details of construction herein shown and described may be modified and still be within the scope of my invention.

I claim as my invention:

1. A brake control for power propelled vehicles comprising a pedal, a pump having a fluid circulating system, a valve seat located in said system and operatively connected with the said pedal, means connectable with the vehicle brakes for obstructing the flow of fluid in said system through said valve seat, to build up a pressure therein, said valve seat being adapted to cause a cumulative back pressure against the pedal as the fluid pressure raises in said fluid circuit.

2. A brake control for power propelled vehicles comprising a pedal, a pump mounted on the transmission shaft, a fluid circuit for said pump, a valve and seat therefor located in said fluid circuit, and means actuated by the depression of said pedal for controlling said valve seat, means connectable with vehicle brakes and cooperating with said valve for obstructing the flow of the fluid in said fluid circuit and causing a pressure in said circuit, said seat being adapted to cause a cumulative back pressure against said pedal as the fluid pressure rises.

3. A brake control for power propelled vehicles comprising a lever, a pump having a fluid circulating system, and means for operating said pump, relatively movable valve and valve seat members arranged in said fluid system and adapted to obstruct the flow of fluid through said system when said lever is operated, one of said members being adapted to be operated by the accumulated pressure to operate a brake connection.

4. A brake control for power propelled vehicles comprising a pedal, a pump having a fluid circulating system and means for operating said pump, relatively reciprocating valve and valve seat arranged in said system and having a port or passage between them through which the fluid in said system may normally flow, means made operative by the movement of the pedal for actuating the seat to close said passage and thereby obstruct the flow of the fluid and create a pressure in said system, the valve having a surface exposed to such pressure to be actuated thereby, and means for connecting such valve with a brake.

5. A brake control for power propelled vehicles comprising a pedal having means for connection with the vehicle brakes, a pump having a fluid circulating system and means for operating said pump, concentrically arranged relatively reciprocating valve and seat elements adapted to close said fluid circulating system and create a pressure therein, one of said elements having means for connection with said pedal and the other element having means for transmitting motion thereof to said brake connecting means.

6. A brake control for power propelled vehicles comprising a pedal, a pump having a fluid circulating system, and means for operating said pump, a cup-shaped valve seat mounted to slide in said system and having a port therein, a valve also having a sliding movement in said system, and cooperating with said seat to open or close a passage between them, said cup-shaped seat having means for connection with said pedal and said valve having means actuated by the movement thereof for transmitting its motion to a brake connecting means.

7. A brake control for power propelled vehicles comprising a pedal having a yielding connection with the vehicle brakes, a pump having a fluid circulating system and means for operating said pump, a valve seat arranged in said fluid circulating system and having means for connection with said pedal, means cooperating with said valve seat to allow normally the free flow of fluid through said system, said valve seat being adapted when actuated by said pedal to obstruct the flow of fluid and create a pressure in said system, said means having a surface exposed to such pressure and actuated thereby, and mechanism for transmitting the movement of said means so actuated to said yielding connection.

8. A brake control for power propelled vehicles comprising a pedal, a pump having a fluid circulating system and means for operating said pump, a valve seat mounted to slide in said system, a rod connected to said valve seat element and having means for connection with said pedal to be reciprocated by movement of said pedal, a valve mounted on said rod, a passage being normally provided between said valve and seat for the flow of the fluid, movement of the pedal actuating said seat to close said passage and create a fluid pressure in the system, said valve being adapted to be actuated by such pressure and having means for transmitting its movement to a brake connection, and yieldable means normally separating valve and seat.

9. A brake control for power propelled vehicles comprising a lever, a pump mounted on the transmission shaft, a fluid circuit for said pump, a valve seat in said circuit connected with said lever and normally permitting the flow of fluid therethrough, and means cooperating with said valve seat for obstructing the flow of fluid and creating a pressure in said circuit, said means being adapted to be actuated by such pressure and having means connectable with vehicle brake.

10. A brake control for power propelled vehicles comprising a lever, a pump mounted on the transmission shaft, a fluid circuit for said pump, a valve seat connected with said lever in said fluid circuit, means connectable with vehicle brakes and adapted to cooperate with said valve seat for temporarily obstructing the flow of fluid in said circuit, said means being actuated by the pressure created through such obstruction for transmitting movement to said brakes, and means for limiting the maximum pressure in said circuit.

11. A brake control for power propelled vehicles comprising a lever, a pump having a fluid circuit, means for driving said pump, a valve seat located in said fluid circuit, a rod connecting said valve seat with said lever, means cooperating with said valve seat to obstruct the flow of fluid through said circuit and create a pressure therein, a brake rod lever connecting said means with the vehicle brake rod, said means being adapted to be operated by the pressure created in said circuit to actuate said brake rod, and yielding means adapted to permit a limited relative movement of said lever and brake rod lever.

12. A brake control for power propelled vehicles, comprising a lever having means for connection with the vehicle brakes, a pump having a fluid circulating system and means for operating said pump, relatively movable valve and seat, means cooperable for obstructing the flow of fluid on the pressure side of the pump and transmitting the force created by such pressure to said vehicle brake connecting means.

13. A brake control for power propelled vehicles comprising a lever having means adapted for yielding connection with vehicle brakes, a pump having a fluid circulating system, and means for operating said pump, a valve seat located in the fluid circuit and normally permitting the flow of fluid therethrough, and adapted to be controlled by said lever, means cooperating with said valve seat for setting the vehicle brakes when the flow of fluid is obstructed through said circuit.

14. A brake control for power propelled vehicles comprising a lever, a pump having a fluid circulating system, means for operating said pump, a valve seat located in the fluid circuit and adapted to be operated by said lever, means connectable with a vehicle brake and cooperating with said valve seat for creating a pressure in said circuit for actuating said means.

15. A brake control for power propelled vehicles comprising a pedal lever, vehicle brakes, a pump having a fluid circulating system, and means for operating said pump, a valve seat connectable with said lever and normally permitting the flow of fluid through said circuit, a valve cooperating with said seat to temporarily obstruct such flow and having means connectable with vehicle brakes, said valve being adapted to be actuated by the pressure created in said circuit to operate said connectable means, said seat having a chamber forming a portion of the fluid circuit.

16. A brake control for power propelled vehicles comprising a lever having means for connection with the brakes, a pump having a fluid circulating system, a movable valve seat member in said system connected with said lever, a valve cooperable with the seat and adapted to be connected with the vehicle brakes, said valve adapted to obstruct the flow of fluid in said system to build up a pressure therein, said movable seat member being adapted to cause cumulative back pressure against said lever as the fluid pressure rises in said circuit, and require additional force on said lever to overcome such back pressure and operate said member.

17. A brake control for power propelled vehicles comprising a pedal, a circulating system including a pump, and a passage establishing communication between opposite sides of the pump, a hollow cylindrical valve seat element, having a sliding fit within said passage, and having a seat at one end, and connected for movement by the pedal, a valve member slidably mounted to be engaged by the seat of said cylindrical element to obstruct fluid flow in the passage, brake-applying means, and connections between said valve member and said brake-applying means.

18. A brake control for power propelled vehicles comprising a pedal, a circulating system including a pump, and a passage establishing communication between opposite sides of the pump, a hollow cylindrical valve sleeve having a sliding fit within said passage, and having a seat at one end, and connected for movement by the pedal, a valve member slidably mounted to be engaged by and to engage the seat of said cylindrical element, to obstruct the flow in the passage, brake applying means, and connections between said valve member and said brake applying means, the area of the seat end of the valve seat element being greater than the area of the receiving end.

19. A brake control for power propelled vehicles comprising a pedal, a pump having a fluid circulating system, a relatively movable valve, and a movable valve seat within the circulating passage, and connections between the pedal and movable seat for translating the seat toward the valve to build up a pressure against valve and seat.

20. A brake control for power propelled vehicles comprising a pedal, a pump having a fluid circulating system, relatively movable valve and valve seat within a circulating passage of the system, and connections between the pedal and movable seat for translating the seat toward the valve, said valve being connected with a brake applying means, and both valve and valve seat being adapted to move together with the pedal connections and the brake-applying means, when the valve is seated in the valve seat.

21. A brake control for power propelled vehicles comprising a pedal, a pump having a fluid circulating system, a relatively movable valve, and a movable valve seat within the circulating passage, connections between the pedal and movable seat for translating the seat toward the valve, the valve seat having a greater area at the valve seat end than at the intake end, causing a back pressure to be built up against the valve seat.

22. A manual and power operated brake for motor vehicles comprising a brake pedal, and a brake operating mechanism, a pump having a fluid circulating system, a valve, a seat having a portion slidably fitting the circulating system, the valve being of greater diameter than the slidably fitting portion of the valve seat, said valve seat being connected to the brake pedal and the said valve being connected to the brake applying means for the purposes specified, and both valve and valve seat being adapted to move together with the pedal connections and the brake-applying means when the valve is seated in the valve seat.

23. A device of the class described having a circulating system, a pedal, and a brake operating mechanism, a hollow cylindrical valve seat element slidably fitted within the system and forming a part of the circulating passage, and a valve element cooperable with the end of the seat and of less area than that part of the system in which it acts, one of the elements being connected to the pedal and the other to the brake applying mechanism, the arrangement being such that proportional pedal pressure to obstruct the flow will proportionately regulate the pressure in said system.

24. A manual and power operated brake for motor vehicles comprising a brake pedal, a fluid circuit system, a movable valve, and a valve seat within the system, means normally yieldably separating valve and valve seat, said valve seat being connected to the brake pedal and said valve being adapted to be connected to brake operating mechanism, the arrangement being such that when the passage of fluid through the system is proportionately obstructed by a proportional closing of the valve seat against the valve, a proportionate fluid pressure will be built up against the valve and thereby assist in setting the brakes.

25. A device of the class described having a circulating system, a pedal and a brake operating mechanism, a hollow cylindrical valve seat slidably mounted in the system, and forming a part thereof, and being flared at its seat end, a valve element cooperable with the seat element, the valve element and the seating portion of the hollow cylindrical element being of less area than that portion of the system in which they cooperate, one of the elements being connected to the pedal and the other to the brake applying mechanism for the purposes set forth.

26. A brake control for power propelled vehicles, comprising brake applying means, a pedal, a driven pump having a fluid circulating system, a fixed passage in direct contact with the fluid and through which the circulating fluid flows, relatively movable valve and valve seat elements located within the fixed passage and connections between the pedal and one of the elements and the brake applying means and the other element.

27. A device of the class described comprising a fluid circulating system including a fixed passage in direct contact with the fluid, relatively movable valve and valve seat elements located and movable within the fixed passage, means for forcibly controlling one of the elements to check the flow, means connected to the other element and adapted to forcibly operate a mechanism when the flow is checked, and means adapted to separate said elements when the force applied by the controlling means is released, and immediately re-establish a free open fluid circuit in said fixed passage.

28. A brake control for power propelled vehicles having a brake applying means, a control means, a fluid circulating system including a fixed passage in direct contact with the fluid and through which the fluid flows, relatively movable valve and valve seat elements located within the fixed passage, and connections between the control means and one of the elements, and between said brake applying means and the other element, said valve and valve seat elements being adapted to obstruct the flow of fluid circuit upon the operation of the control means, and means adapted to operate the valve elements to immediately re-establish the free open fluid circuit, upon the release of the control means, after operation thereof to obstruct the flow.

29. A brake control for power propelled vehicles having brake applying means, comprising a lever having means adapted for a yielding connection with vehicle brakes, a driven pump having a fluid circulating system, a fixed passage in direct contact with the fluid through which the circulating fluid flows, relatively movable valve and valve seat elements located within the fixed passage for obstructing the flow of the fluid through said passage, and connections between the lever and one of the elements and the brake applying means and other element.

30. A brake control for power propelled vehicles having brake applying means, comprising a pedal adapted for connection with vehicle brakes, a driven pump having a fluid circulating system, a fixed passage in direct contact with the fluid and through which the circulating fluid flows, valve and valve seat elements located in the fixed passage cooperable for obstructing the flow of the fluid through said passage, said valve and valve seat elements having a yielding means to cause same to remain normally separated one from the other to permit a free or unobstructed fluid circuit, means for limiting the separation between the valve and valve seat elements and connections between the pedal and one of the elements and the brake applying means and the other element.

In witness whereof, I have hereunto set my hand this 5th day of December, 1925.

EDWIN G. STAUDE.